United States Patent
Yang et al.

(10) Patent No.: US 12,088,105 B2
(45) Date of Patent: Sep. 10, 2024

(54) POWER DERATING METHOD FOR PHOTOVOLTAIC TRACKING SYSTEM, CONTROLLER, AND PHOTOVOLTAIC TRACKING SYSTEM

(71) Applicant: Sungrow Renewables Development Co., Ltd., Hefei (CN)

(72) Inventors: Zongjun Yang, Hefei (CN); Shaokun Zou, Hefei (CN); Yanhu Zhang, Hefei (CN); Xiaoguang Li, Hefei (CN)

(73) Assignee: Sungrow Renewables Development Co., Ltd., Hefei (CN)

( * ) Notice: Subject to any disclaimer, the term of this patent is extended or adjusted under 35 U.S.C. 154(b) by 280 days.

(21) Appl. No.: 17/687,541

(22) Filed: Mar. 4, 2022

(65) Prior Publication Data
US 2022/0294227 A1    Sep. 15, 2022

(30) Foreign Application Priority Data
Mar. 10, 2021    (CN) .......................... 202110260494.7

(51) Int. Cl.
*H02J 3/38* (2006.01)
*H02S 20/32* (2014.01)

(52) U.S. Cl.
CPC .............. *H02J 3/381* (2013.01); *H02S 20/32* (2014.12); *H02J 2300/26* (2020.01)

(58) Field of Classification Search
CPC .......... H02J 3/38; H02J 3/391; H02J 2300/26; H02S 20/32
See application file for complete search history.

(56) References Cited

U.S. PATENT DOCUMENTS

2013/0061908 A1    3/2013    Wagoner
2014/0360555 A1    12/2014    Kim et al.

FOREIGN PATENT DOCUMENTS

| CN | 107154647 A | 9/2017 |
| CN | 107976951 A | 5/2018 |
| CN | 108880439 A | 11/2018 |

*Primary Examiner* — Robert L Deberadinis
(74) *Attorney, Agent, or Firm* — Wolf, Greenfield & Sacks, P.C.

(57) ABSTRACT

A power derating method for a photovoltaic tracking system, a controller and a photovoltaic tracking system are provided. A current operating power and a target derating power of a photovoltaic inverter are acquired. A total power derating amount is calculated based on the current operating power and the target derating power. A target power derating amount by a photovoltaic tracker is determined based on the total power derating amount and a preset derating amount distribution coefficient. A target tracking angle is determined based on the target power derating amount. The photovoltaic tracker is controlled to adjust a photovoltaic module to be at the target tracking angle and fix the photovoltaic module. The photovoltaic inverter is controlled to adjust a direct current operating voltage based on a difference between the total power derating amount and the target power derating amount.

18 Claims, 8 Drawing Sheets

POWER DERATING METHOD FOR PHOTOVOLTAIC TRACKING SYSTEM, CONTROLLER, AND PHOTOVOLTAIC TRACKING SYSTEM

The present application claims priority to Chinese Patent Application No. 202110260494.7, titled "POWER DERATING METHOD FOR PHOTOVOLTAIC TRACKING SYSTEM, CONTROLLER, AND PHOTOVOLTAIC TRACKING SYSTEM", filed on Mar. 10, 2021 with the China National Intellectual Property Administration (CNIPA), which is incorporated herein by reference in its entirety.

FIELD

The present disclosure relates to the technical field of power control for a photovoltaic tracking system, and in particular to a power derating method for a photovoltaic tracking system, a controller of a photovoltaic tracking system and a photovoltaic tracking system.

BACKGROUND

A photovoltaic tracking system is a kind of photovoltaic system that automatically tracks the sun to increase overall amount of power generation. Generally, the photovoltaic tracking system performs maximum power point tracking (MPPT). In a case that thermal stress or electric stress of a photovoltaic inverter is insufficient, or in a case that a power grid dispatches power of a photovoltaic power station, the photovoltaic tracking system performs power derating in response to a derating instruction.

Figure 1:
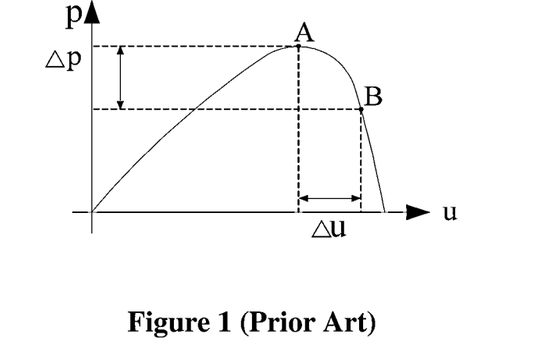
FIG. 1 is a schematic diagram showing a power-voltage (p-u) characteristic curve of a photovoltaic tracking system according to the conventional technology.

At present, there are mainly two power derating manners. In a first manner, the photovoltaic inverter changes a command voltage for the MPPT, to increase an output voltage of a photovoltaic module, to deviate an operating point of the photovoltaic module from a maximum power point. FIG. 1 shows a power-voltage (p-u) characteristic curve of a photovoltaic tracking system. Through the first manner, the photovoltaic inverter is adjusted to operate at a derating power which is decreased by $\Delta p$, and the operating point shifts from a point A to a point B. Accordingly, an operating voltage of the photovoltaic module is increased by $\Delta u$. In the first manner, the operating voltage of the entire photovoltaic system is increased, since electrical stress and thermal stress of the photovoltaic inverter are limited, a voltage across an internal direct current bus is increased with the increase of the direct current voltage. When the voltage across the internal direct current increases to a certain voltage threshold, component stress is prone to exceed a safety threshold, resulting in a failure to respond to derating due to safety protection. Further, the photovoltaic system operates at an excessively high voltage, current harmonics is increased, resulting in a decreased power quality. In a second manner, a tracking angle of the photovoltaic tracking system is adjusted in real time, to operate the photovoltaic inverter at limited output power. Due to changing optical power, the photovoltaic tracking system is required to be adjusted frequently. Therefore, in order to ensure the photovoltaic inverter to operate at the limited power, a photovoltaic tracking bracket is adjusted frequently to adjust an angle of inclination of the photovoltaic module, adversely affecting reliability and a service life of the photovoltaic tracking system.

Therefore, a power derating method for a photovoltaic tracking system is urgently to be provided by those skilled in the art, to solve the above problems.

SUMMARY

In view of this, a power derating method for a photovoltaic tracking system, a controller of a photovoltaic tracking system and a photovoltaic tracking system are provided according to the present disclosure, to decrease component stress while performing power derating, thereby improving power quality, thus increasing reliability and a service life of the photovoltaic tracking system.

A power derating method for a photovoltaic tracking system is provided. The method is applied to a controller of the photovoltaic tracking system. The method includes: acquiring a current operating power and a target derating power of a photovoltaic inverter; calculating a total power derating amount based on the current operating power and the target derating power; determining a target power derating amount by a photovoltaic tracker based on the total power derating amount and a preset derating amount distribution coefficient; determining a target tracking angle based on the target power derating amount, and controlling the photovoltaic tracker to adjust a photovoltaic module to be at the target tracking angle and fix the photovoltaic module; and controlling the photovoltaic inverter to adjust a direct current operating voltage based on a difference between the total power derating amount and the target power derating amount.

In an embodiment, the determining a target tracking angle based on the target power derating amount, and controlling the photovoltaic tracker to adjust a photovoltaic module to be at the target tracking angle and fix the photovoltaic module includes: calculating a target power of the photovoltaic tracking system based on the current operating power and the target power derating amount; determining a target tracking angle corresponding to the target power based on a correspondence between a power and a tracking angle, where the correspondence is pre-determined based on a change in an optical power; and controlling the photovoltaic tracker to adjust the photovoltaic module to be at the target tracking angle and fix the photovoltaic module.

In an embodiment, the controlling the photovoltaic tracker to adjust the photovoltaic module to be at the target tracking angle and fix the photovoltaic module includes: controlling the photovoltaic tracker to adjust the photovoltaic module forward to be at the target tracking angle and fix the photovoltaic module; or controlling the photovoltaic tracker to adjust the photovoltaic nodule backward to be at the target tracking angle and fix the photovoltaic module.

In an embodiment, the determining a target tracking angle based on the target power derating amount, and controlling the photovoltaic tracker to adjust a photovoltaic module to be at the target tracking angle and fix the photovoltaic module comprises: calculating a target power of the photovoltaic tracking system based on the current operating power and the target power derating amount; controlling the photovoltaic tracker to dynamically adjust a tracking angle of the photovoltaic module, and acquiring a latest operating power of the photovoltaic tracking system in real time; determining, when the latest operating power is equal to the target power, a tracking angle corresponding to the latest operating power that is equal to the target power, as the target tracking angle; and controlling the photovoltaic tracker to fix the photovoltaic module at the target tracking angle.

In an embodiment, the controlling the photovoltaic inverter to adjust a direct current operating voltage based on a difference between the total power derating amount and the target power derating amount includes: controlling, based on the difference between the total power derating amount and the target power derating amount, the photovoltaic inverter to adjust the direct current operating voltage of the photovoltaic module to the left from the maximum power point or adjust the direct current operating voltage of the photovoltaic module to the right from the maximum power point.

In an embodiment, the controlling the photovoltaic inverter to adjust a direct current operating voltage based on a difference between the total power derating amount and the target power derating amount includes: controlling, in case of a single photovoltaic inverter and based on the difference, the photovoltaic inverter to adjust the direct current operating voltage of each of all or some of photovoltaic modules in a photovoltaic string connected to the photovoltaic inverter; and controlling, in a case of multiple photovoltaic inverters and based on the difference, each of all or some of the multiple photovoltaic inverters to adjust a voltage of a photovoltaic string connected to the photovoltaic inverter to a target voltage.

In an embodiment, after the controlling the photovoltaic inverter to adjust a direct current operating voltage based on a difference between the total power derating amount and the target power derating amount, the method further includes: if adjustment performed by the photovoltaic inverter is beyond a preset adjustment capability and the difference is still greater than zero, acquiring a latest operating power of the photovoltaic inverter, and performing power derating based on the latest operating power and the target derating power.

In an embodiment, after the controlling the photovoltaic inverter to adjust a direct current operating voltage based on a difference between the total power derating amount and the target power derating amount, the method further includes: if the current operating power of the photovoltaic inverter is lower than the target derating power or power limitation of the photovoltaic tracking system is eliminated, controlling the photovoltaic inverter to perform maximum power point tracking (MPPT), and controlling the photovoltaic tracker to perform automatic tracking.

A controller of a photovoltaic tracking system is further provided. The controller includes an acquiring unit, a calculating unit, an amount determining unit, an angle adjusting unit, and a voltage adjusting unit. The acquiring unit is configured to acquire a current operating power and a target derating power of a photovoltaic inverter. The calculating unit is configured to calculate a total power derating amount based on the current operating power and the target derating power. The amount determining unit is configured to determine a target power derating amount by a photovoltaic tracker based on the total power derating amount and a preset derating amount distribution coefficient. The angle adjusting unit is configured to determine a target tracking angle based on the target power derating amount, and control the photovoltaic tracker to adjust the photovoltaic module to the target tracking angle and fix the photovoltaic module. The voltage adjusting unit is configured to control the photovoltaic inverter to adjust a direct current operating voltage based on a difference between the total power derating amount and the target power derating amount.

In an embodiment, the angle adjusting unit is further configured to: calculate a target power of the photovoltaic tracking system based on the current operating power and the target power derating amount; determine a target tracking angle corresponding to the target power based on a correspondence between a power and a tracking angle, where the correspondence is pre-determined based on a change in an optical power; and control the photovoltaic tracker to adjust the photovoltaic module to be at the target tracking angle and fix the photovoltaic module.

In an embodiment, the angle adjusting unit is further configured to: calculate a target power of the photovoltaic tracking system based on the current operating power and the target power derating amount; control the photovoltaic tracker to dynamically adjust a tracking angle of the photovoltaic module, and acquire a latest operating power of the photovoltaic tracking system in real time; determine, when the latest operating power is equal to the target power, a tracking angle corresponding to the latest operating power that is equal to the target power, as the target tracking angle; and control the photovoltaic tracker to fix the photovoltaic module at the target tracking angle.

In an embodiment, the controller further includes a returning unit. The returning unit is configured to acquire, after the voltage adjusting unit controls the photovoltaic inverter to adjust the direct current operating voltage based on the difference between the total power derating amount and the target power derating amount, and if adjustment performed by the photovoltaic inverter is beyond a preset adjustment capability and the difference is still greater than zero, a latest operating power of the photovoltaic inverter and perform power derating based on the latest operating power and the target derating power.

In an embodiment, the controller further includes a state returning unit. The state returning unit is configured to control, after the voltage adjusting unit controls the photovoltaic inverter to adjust the direct current operating voltage based on the difference between the total power derating amount and the target power derating amount, and if the current operating power of the photovoltaic inverter is lower than the target derating power or power limitation of the photovoltaic tracking system is eliminated, the photovoltaic inverter to perform maximum power point tracking (MPPT), and the photovoltaic tracker to perform automatic tracking.

A photovoltaic tracking system is further provided. The photovoltaic tracking system includes a photovoltaic module, a photovoltaic tracker, a photovoltaic inverter, and the controller as described above. The controller is communicably connected to the photovoltaic tracker and the photovoltaic inverter. The photovoltaic tracker is mechanically connected to at least one of the photovoltaic module. The photovoltaic inverter comprises a direct current end connected to at least one of the photovoltaic module.

It can be seen from the above technical solutions that a power derating method for a photovoltaic tracking system, a controller of a photovoltaic tracking system and a photovoltaic tracking system are provided according to the present disclosure. A current operating power and a target derating power of a photovoltaic inverter are acquired. A total power derating amount is calculated based on the current operating power and the target derating power. A target power derating amount by a photovoltaic tracker is determined based on the total power derating amount and a preset derating amount distribution coefficient. A target tracking angle is determined based on the target power derating amount. The photovoltaic tracker is controlled to adjust a photovoltaic module to be at the target tracking angle and fix the photovoltaic module. The photovoltaic inverter is controlled to adjust a direct current operating voltage based on a difference between the total power derating amount and the target power derating amount. In order to perform power derating by the photovoltaic inverter according to the present disclosure, it is unnecessary to increase the operating voltage of the entire photovoltaic system. Based on the current operating power and the target derating power of the photovoltaic inverter, the photovoltaic tracker is controlled to adjust the photovoltaic module to be at the target tracking angle and fix the photovoltaic module, so that the power derating is performed partly based on the target power derating amount to decrease a current and output power significantly, thereby avoiding an increase in component stress and a decrease in power quality. Then, the power derating is further performed by the photovoltaic inverter based on the difference obtained by subtracting the target power derating amount from the total power derating amount, so that the power derating is performed completely. In this way, the reliability of the photovoltaic tracking system is increased while performing the power derating, without affecting the service life of the photovoltaic tracking system.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. It is apparent that the drawings in the following description show only some embodiments of the present disclosure, and other drawings may be obtained by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

A power derating method for a photovoltaic tracking system, a controller of a photovoltaic tracking system and a photovoltaic tracking system are provided according to the present disclosure. A current operating power and a target derating power of a photovoltaic inverter are acquired. A total power derating amount is calculated based on the current operating power and the target derating power. A target power derating amount by a photovoltaic tracker is determined based on the total power derating amount and a preset derating amount distribution coefficient. A target tracking angle is determined based on the target power derating amount. The photovoltaic tracker is controlled to adjust a photovoltaic module to be at the target tracking angle and fix the photovoltaic module. The photovoltaic inverter is controlled to adjust a direct current operating voltage based on a difference between the total power derating amount and the target power derating amount. In order to perform power derating by the photovoltaic inverter according to the present disclosure, it is unnecessary to increase the operating voltage of the entire photovoltaic system. Based on the current operating power and the target derating power of the photovoltaic inverter, the photovoltaic tracker is controlled to adjust the photovoltaic module to be at the target tracking angle and fix the photovoltaic module, so that the power derating is performed partly based on the target power derating amount to decrease a current and output power significantly, thereby avoiding an increase in component stress and a decrease in power quality. Then, the power derating is further performed by the photovoltaic inverter based on the difference obtained by subtracting the target power derating amount from the total power derating amount, until the power derating is performed completely. In this way, the reliability of the photovoltaic tracking system is increased while performing the power derating, without affecting the service life of the photovoltaic tracking system.

Figure 2:
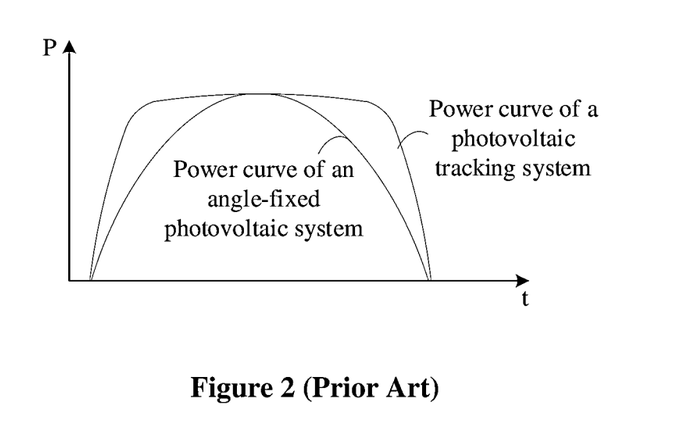
FIG. 2 is a schematic diagram showing a power curve of a conventional angle-fixed photovoltaic system and a power curve of a photovoltaic tracking system.

Power generation efficiency of a photovoltaic module is directly related to an angle of incidence of incoming sunlight on a surface of the photovoltaic module. When the incoming sunlight is perpendicular to the surface of the photovoltaic module, the photovoltaic module receives the most solar energy, and the power generation efficiency is the highest. The photovoltaic tracking system can automatically track the sun, and adjust an angle of inclination of the photovoltaic module in real time by rotating a photovoltaic tracking bracket on which the photovoltaic module is arranged, to ensure that the incoming sunlight is perpendicular to the surface of the photovoltaic module. Reference is made to FIG. 2, which is a schematic diagram showing a power curve of a conventional angle-fixed photovoltaic system and a power curve of a photovoltaic tracking system. As shown in FIG. 2, the photovoltaic tracking system has a higher power generation amount than the conventional angle-fixed photovoltaic system. Therefore, the photovoltaic tracking system has become a main trend of the photovoltaic system.

Figure 3:
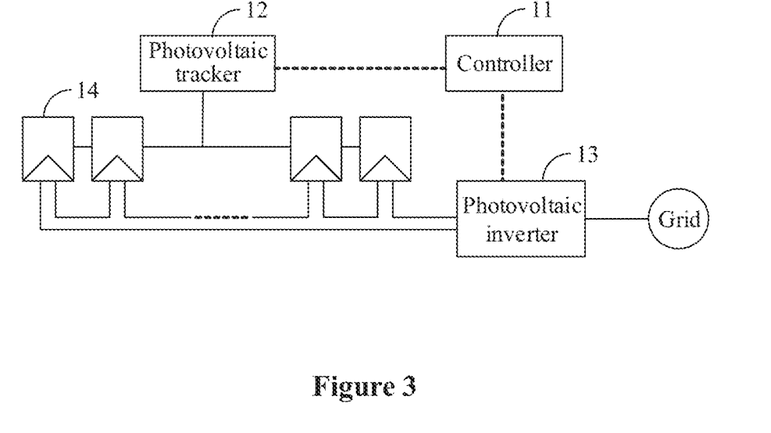
FIG. 3 is a schematic structural diagram of a photovoltaic tracking system according to an embodiment of the present disclosure.

To facilitate understanding of operation principles of the photovoltaic tracking system, reference is made to FIG. 3, which is a schematic structural diagram of a photovoltaic tracking system according to an embodiment of the present disclosure. The photovoltaic tracking system includes a controller 11, a photovoltaic tracker 12, a photovoltaic inverter (DC/AC) 13 and a photovoltaic module 14.

The controller 11 is communicably connected to the photovoltaic tracker 12 and the photovoltaic inverter 13. In practice, the controller 1I may be embedded in the photovoltaic tracker 12 or the photovoltaic inverter 13.

The photovoltaic tracker 12 is mechanically connected to at least one photovoltaic module 14, and is configured to automatically adjust an angle of the photovoltaic module 14 to change solar energy received on the surface of the photovoltaic module 14. In a case that multiple photovoltaic modules 14 form a photovoltaic array, the photovoltaic tracker 12 is mechanically connected to the photovoltaic array. If there are multiple photovoltaic arrays, the multiple photovoltaic arrays are electrically connected to each other. For each of the multiple photovoltaic arrays, the photovoltaic tracker 12 may automatically adjust an angle of the photovoltaic array, to change solar energy received on a surface of a photovoltaic module in the photovoltaic array.

A direct current end of the photovoltaic inverter 13 is connected to at least one photovoltaic module 14. If there are multiple photovoltaic modules 14, the multiple photovoltaic modules 14 are electrically connected in series to form a photovoltaic string, and the photovoltaic string is connected in parallel to the direct current end of the photovoltaic inverter 13. An output end of the photovoltaic inverter 13 is connected to a power grid Grid.

Generally, the photovoltaic inverter 13 performs maximum power point tracking (MPPT). The photovoltaic tracker 12 automatically orients the photovoltaic module to acquire the maximum solar energy, so that the photovoltaic power station outputs the maximum power.

In a case that thermal stress or electric stress of the photovoltaic inverter 13 is insufficient and therefore the photovoltaic inverter 13 is required to operate at a power below its power rating, or in a case that the power grid dispatches power of the photovoltaic power station to ensure stability of a grid system and limit power output, the photovoltaic inverter 13 performs power derating. In both of the two cases, it is required to decrease the power of the system.

Figure 4:
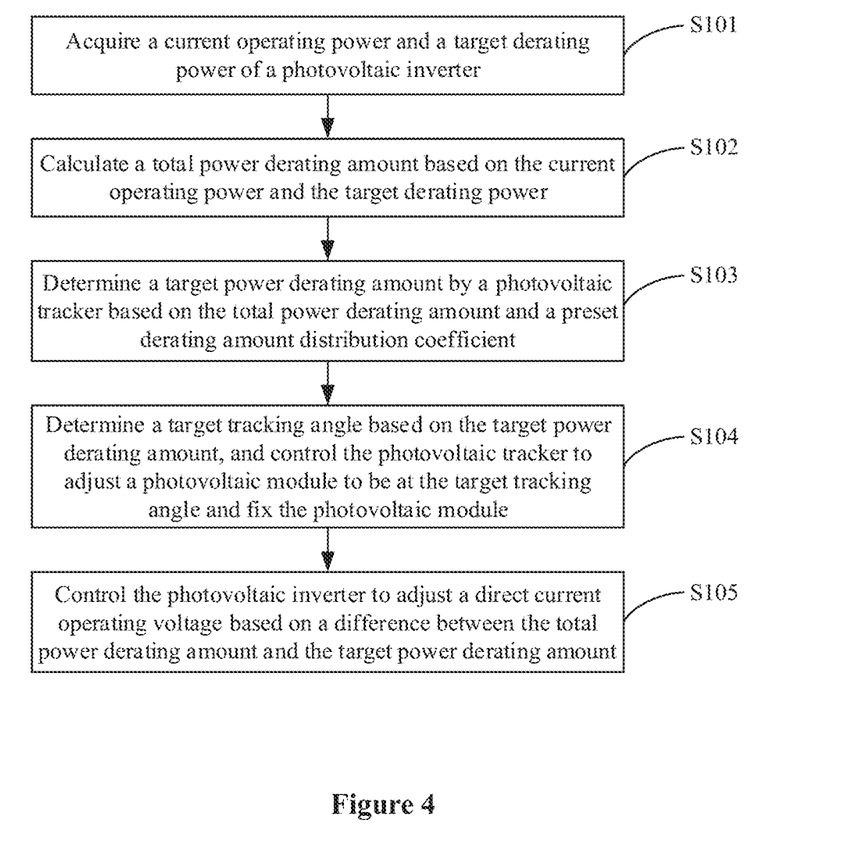
FIG. 4 is a flowchart of a power derating method for a photovoltaic tracking system according to an embodiment of the present disclosure.

In view of this, reference is made to FIG. 4, which is a flowchart of a power derating method for a photovoltaic tracking system according to an embodiment of the present disclosure. The method is applied to a controller in an embodiment shown in FIG. 3, and includes the following steps S101 to S105.

In step S101, a current operating power and a target derating power of a photovoltaic inverter are acquired.

In this embodiment, a target derating power P1 may be represented in various forms, such as a set power and a percentage of power. In practice, the target derating power is directly set. For example, the photovoltaic inverter is required to operate at a power not greater than 50 kW, that is, P1=50 kW. Alternatively, a target derating power is determined to be equal to 50% of the power rating Pn, that is, P1=50%*Pn, or a target derating power is determined to be equal to 50% of a current power P0, that is, P1=50%*P0. The target derating power P1 can be obtained through simple calculation and conversion regardless of a form in which the target derating power P1 is represented.

In step S102, a total power derating amount is calculated based on the current operating power and the target derating power.

A total power derating amount $\Delta P$ is calculated from the following equation (1):

$$\Delta P = P0 - P1 \quad (1)$$

where P0 represents the current operating power of the photovoltaic inverter, and P1 represents the target derating power.

In step S103, a target power derating amount by a photovoltaic tracker is determined based on the total power derating amount and a preset derating amount distribution coefficient.

A target power derating amount $\Delta Pt$ by the photovoltaic tracker is calculated from the following equation (2):

$$\Delta Pt = k*(P0 - P1) = k*\Delta P \quad (2)$$

where k represents the preset derating amount distribution coefficient which has a value that is an element of (0, 1). An excessively small value of k results in failure in full use of the photovoltaic tracker in power derating. In a case of an excessively large value of k, or in a case that the power derating for the entire photovoltaic tracking system is completely performed by the photovoltaic tracker, the optical power is still changing after the tracking angle is fixed and therefore the photovoltaic inverter cannot increase the power, especially when the sunlight becomes weak. In this case, it is required to control the photovoltaic tracker to adjust a photovoltaic tracking bracket frequently, affecting a service life of the photovoltaic tracking bracket. It is found from research that the value of k preferably ranges from 0.5 to 0.7. With the value of k ranging from 0.5 to 0.7, it can be ensured that the power is mostly decreased by the photovoltaic tracker and then the power is further slightly decreased by the photovoltaic inverter.

It should be noted that in order to realize power derating according to the present disclosure, the total power derating amount $\Delta P$ is divided into two parts. First, in response to a request for power derating, the photovoltaic module is adjusted to be at an angle and is fixed at the angle, so that the power is mostly decreased by $\Delta Pt$. Then, the photovoltaic inverter slightly adjusts the voltage to further decrease the power by $\Delta Pi$ ($\Delta Pi=\Delta P-\Delta Pt$). That is, the photovoltaic tracker performs coarse adjustment and the photovoltaic inverter performs fine adjustment, thereby achieving the best adjustment effect.

For example, the current operating power of the photovoltaic inverter is P0, the target derating power is P1, and the target power derating amount $\Delta P$ of the photovoltaic tracker is calculated from the equations (1) and (2). A target tracking angle is determined based on the target power derating amount $\Delta Pt$. The photovoltaic tracker is controlled to adjust the photovoltaic module to be at the target tracking angle and fix the photovoltaic module.

In step S104, the target tracking angle is determined based on the target power derating amount. The photovoltaic tracker is controlled to adjust the photovoltaic module to be at the target tracking angle and fix the photovoltaic module.

The photovoltaic module in this embodiment may be a single-sided module or a double-sided module, depending on actual needs, which is not limited in the present disclosure.

In step S105, the photovoltaic inverter is controlled to adjust a direct current operating voltage based on a difference between the total power derating amount and the target power derating amount.

The photovoltaic inverter is controlled to adjust the direct current operating voltage in the traditional MTTP adjustment manner. For details, reference is made to the existing technical solutions, which are not described in detail herein.

After the photovoltaic module is adjusted by the photovoltaic tracker to be at the target tracking angle and is fixed at the target tracking angle, the photovoltaic inverter adjusts the direct current operating voltage based on the difference between the total power derating amount and the target power derating amount.

A power derating amount ΔPi by the photovoltaic inverter is calculated from the following equation (3):

$$\Delta Pi = \Delta P - \Delta Pt \quad (3)$$

where the power derating amount ΔPi by the photovoltaic inverter is presented in another form of ΔPi=(1−k)*(P0−P1) by substituting the equation (1) and the equation (2) into the equation (3).

In summary, a power derating method for a photovoltaic tracking system is provided according to the present disclosure. A current operating power and a target derating power of a photovoltaic inverter are acquired. A total power derating amount is calculated based on the current operating power and the target derating power. A target power derating amount by a photovoltaic tracker is determined based on the total power derating amount and a preset derating amount distribution coefficient. A target tracking angle is determined based on the target power derating amount. The photovoltaic tracker is controlled to adjust a photovoltaic module to be at the target tracking angle and fix the photovoltaic module. The photovoltaic inverter is controlled to adjust a direct current operating voltage based on a difference between the total power derating amount and the target power derating amount. In order to perform power derating by the photovoltaic inverter according to the present disclosure, it is unnecessary to increase the operating voltage of the entire photovoltaic system. Based on the current operating power and the target derating power of the photovoltaic inverter, the photovoltaic tracker is controlled to adjust the photovoltaic module to be at the target tracking angle and fix the photovoltaic module, so that the power derating is performed partly based on the target power derating amount to decrease a current and output power significantly, thereby avoiding an increase in component stress and a decrease in power quality. Further, the power derating is performed by the photovoltaic inverter based on the difference obtained by subtracting the target power derating amount from the total power derating amount, so that the power derating is performed completely. In this way, the reliability of the photovoltaic tracking system is increased while performing the power derating, without affecting the service life of the photovoltaic tracking system.

In the above embodiment, since it is required to input the target tracking angle θ to the photovoltaic tracking system, after calculating the power amount ΔPt by which the photovoltaic tracking system is to be decreased, the controller needs to convert the power amount ΔPt into the target tracking angle θ in one of the following two manners.

A first manner is implemented based on a correspondence table.

Figure 5:
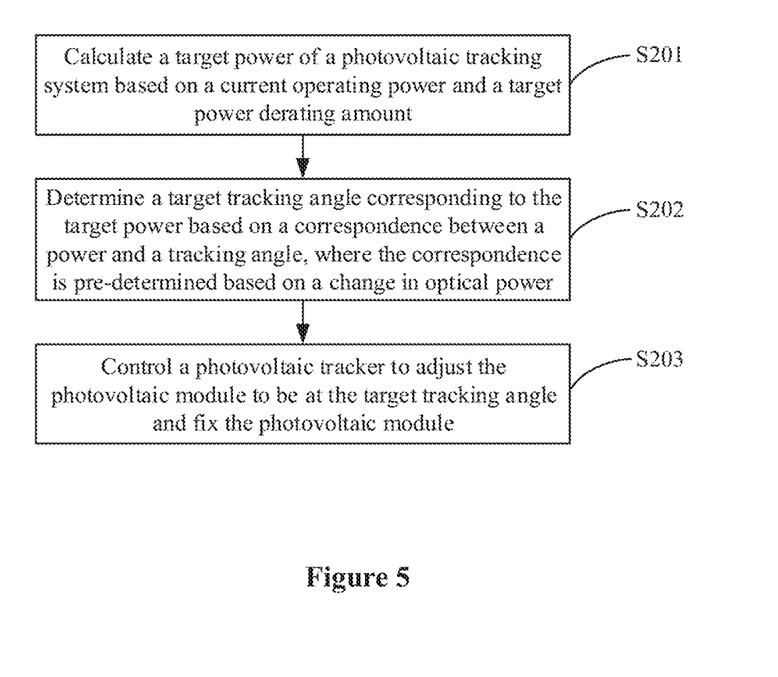
FIG. 5 is a flowchart showing a process of determining a target tracking angle based on a target power derating amount, controlling a photovoltaic tracker to adjust a photovoltaic module to be at the target tracking angle and fix the photovoltaic module according to an embodiment of the present disclosure.

Reference is made to FIG. 5, which is a flowchart showing a process of determining a target tracking angle based on a target power derating amount, controlling a photovoltaic tracker to adjust a photovoltaic module to the target tracking angle and fix the photovoltaic module according to an embodiment of the present disclosure. That is, step 104 includes the following steps S201 to S203.

In step S201, a target power of the photovoltaic tracking system is calculated based on the current operating power and the target power derating amount.

In step S202, a target tracking angle corresponding to the target power is determined based on a correspondence between a power and a tracking angle. The correspondence is pre-determined based on a change in an optical power.

In step S203, the photovoltaic tracker is controlled to adjust the photovoltaic module to be at the target tracking angle and fix the photovoltaic module.

In the first manner based on the correspondence table, the correspondence (which may be shown in a table) between the power and the tracking angle is pre-determined based on the change in optical power. After the target power of the photovoltaic tracking system is calculated based on the current operating power and the target power derating amount, the target tracking angle corresponding to the target power is acquired based on the correspondence, so that the photovoltaic tracker is controlled to adjust the photovoltaic module to be at the target tracking angle, and the photovoltaic module is fixed at the target tracking angle. In the first manner, open-loop adjustment is performed with a relatively coarse adjustment result. With the open-loop adjustment, the photovoltaic module is quickly adjusted to be at the target tracking angle, so as to decrease the power.

In this embodiment, step S203 includes: controlling the photovoltaic tracker to adjust the photovoltaic module forward to be at the target tracking angle and fix the photovoltaic module, or adjust the photovoltaic nodule backward to be at the target tracking angle and fix the photovoltaic module.

Adjusting the photovoltaic module forward indicates that the photovoltaic module is adjusted from east to west, that is, orienting the photovoltaic module toward the sun. Adjusting the photovoltaic module backward indicates that the photovoltaic module is adjusted from west to east.

The photovoltaic tracking system is generally so controlled that the surface of the photovoltaic module is perpendicular to the incoming sunlight. In practice, the power can be decreased by adjusting the photovoltaic module to the target tracking angle forward or backward. Therefore, a direction in which the photovoltaic module is adjusted by the photovoltaic tracking system is not limited herein.

In a second manner, closed-loop adjustment is performed.

Figure 6:
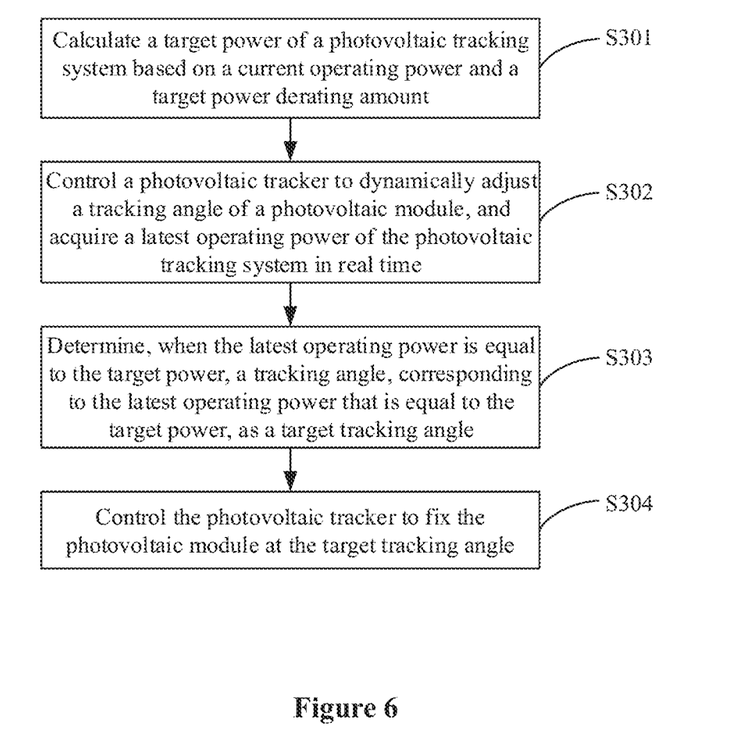
FIG. 6 is a flowchart showing a process of determining a target tracking angle based on a target power derating amount, controlling a photovoltaic tracker to adjust a photovoltaic module to be at the target tracking angle and fix the photovoltaic module according to another embodiment of the present disclosure.

Reference is made to FIG. 6, which is a flowchart showing a process of determining a target tracking angle based on a target power derating amount, controlling a photovoltaic tracker to adjust a photovoltaic module to the target tracking angle and fix the photovoltaic module according to another embodiment of the present disclosure. That is, step 104 includes the following steps S301 to S304.

In step S301, a target power of the photovoltaic tracking system is calculated based on the current operating power and the target power derating amount.

In step S302, the photovoltaic tracker is controlled to dynamically adjust a tracking angle of the photovoltaic module, and the latest operating power of the photovoltaic tracking system is acquired in real time.

In step S303, when the latest operating power is equal to the target power, a tracking angle corresponding to the latest operating power that is equal to the target power is determined as the target tracking angle.

In step S304, the photovoltaic tracker is controlled to fix the photovoltaic module at the target tracking angle.

In the closed-loop adjustment according to this embodiment, the controller controls the photovoltaic tracker to dynamically adjust the tracking angle of the photovoltaic module, and acquires the latest operating power of the photovoltaic tracking system in real time. When the power is decreased by ΔPt, that is, when the latest operating power is equal to the target power, the controller controls the photovoltaic tracker to fix the photovoltaic module at the target tracking angle.

The photovoltaic inverter slightly adjusts the power by changing an operating voltage of the photovoltaic module. In the vicinity of a maximum power point (MPP), the power can be decreased by adjusting a voltage point either to the left or to the right. Since an output current of the photovoltaic module is greatly decreased by the photovoltaic tracker, the thermal stress will not excessively large even if the photovoltaic inverter adjusts an operating point to the left. Therefore, the photovoltaic inverter can flexibly adjust the operating voltage in any direction.

In order to optimize the above embodiment, step S105 includes: controlling, based on the difference between the total power derating amount and the target power derating amount, the photovoltaic inverter to adjust the direct current operating voltage of the photovoltaic module to the left from the maximum power point or adjust the direct current operating voltage of the photovoltaic module to the right from the maximum power point.

In order to optimize the above embodiment, step S105 further includes: in case of a single photovoltaic inverter, controlling, based on the difference between the total power derating amount and the target power derating amount, the photovoltaic inverter to adjust the direct current operating voltage of each of all or some of photovoltaic modules in a photovoltaic string connected to the photovoltaic inverter; and in a case of multiple photovoltaic inverters, controlling, based on the difference between the total power derating amount and the target power derating amount, each of all or some of the multiple photovoltaic inverters to adjust a voltage of a photovoltaic string connected to the photovoltaic inverter to be a target voltage.

The optical power is changing during the power derating. After the photovoltaic tracker adjusts the photovoltaic module to be at the target tracking angle and fixes the photovoltaic module at the target tracking angle, the photovoltaic inverter performs rapid adjustment for the power derating. Only when the adjustment performed by the photovoltaic inverter is beyond the adjustment capacity (for example, reaching a set stress margin), the total power derating amount $\Delta P$ is recalculated, and the photovoltaic tracking system is readjusted.

Figure 7:
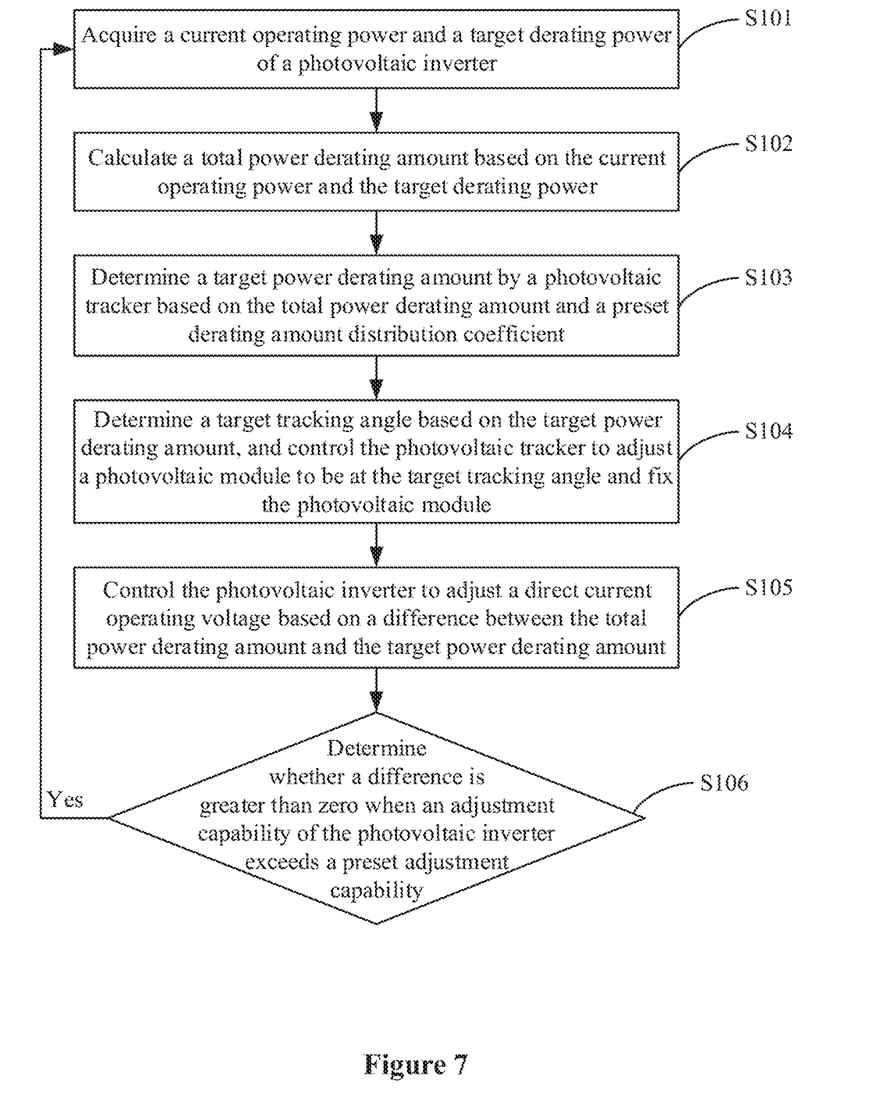
FIG. 7 is a flowchart of a power derating method for a photovoltaic tracking system according to another embodiment of the present disclosure.

In order to optimize the above embodiment, reference is made to FIG. 7, which is a flowchart of a power derating method for a photovoltaic tracking system according to another embodiment of the present disclosure. Based on the embodiment shown in FIG. 4, the method further includes the following step S106 after step S105.

In step S106, it is determined whether the adjustment performed by the photovoltaic inverter is beyond a preset adjustment capability and the difference is still greater than zero. If it is determined that the adjustment is beyond a preset adjustment capability of the photovoltaic inverter and the difference is still greater than zero, the method returns to step S101. Latest operating power of the photovoltaic inverter is acquired, and power derating is performed based on the latest operating power and the target derating power.

In this embodiment, when the adjustment is beyond a preset adjustment capability of the photovoltaic inverter and the difference is still greater than zero, the method returns to step S101. The processing shown in FIG. 4 is repeated. Conversely, when the adjustment is within a preset adjustment capability of the photovoltaic inverter and the difference is still greater than zero, the photovoltaic inverter is controlled to adjust the direct current operating voltage until the difference is not greater than 0.

Figure 8:
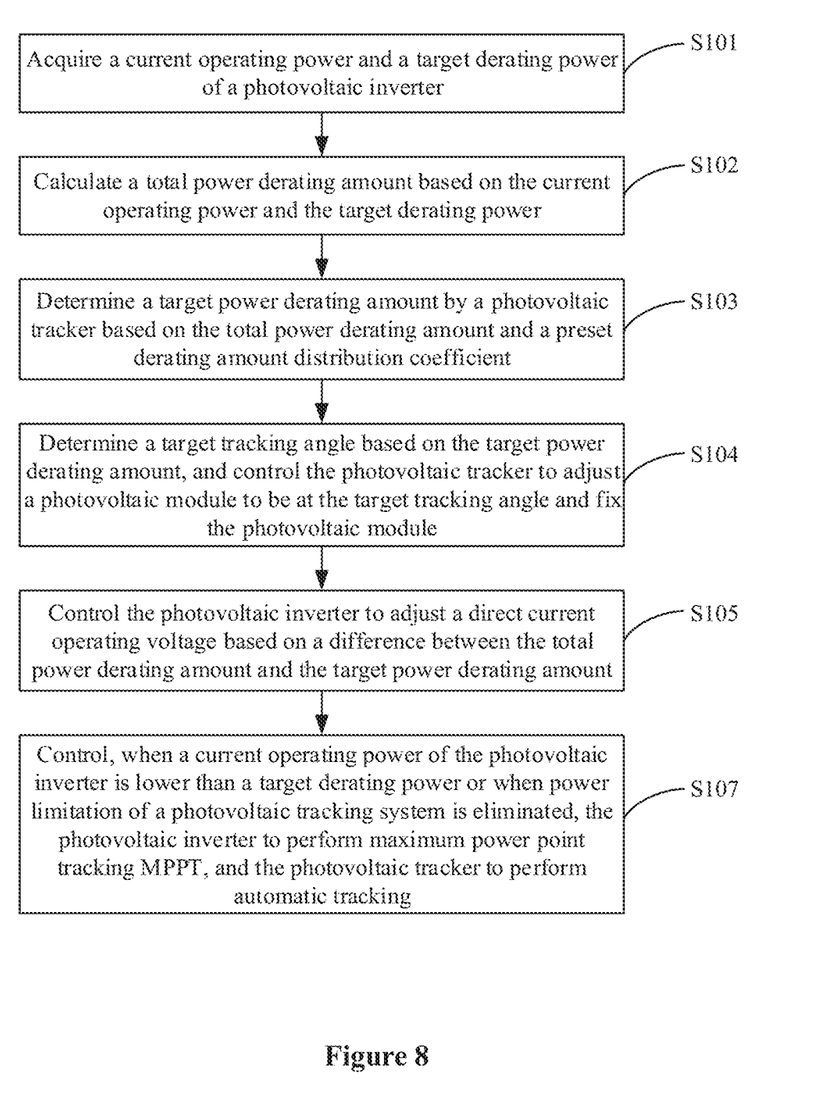
FIG. 8 is a flowchart of a power derating method for a photovoltaic tracking system according to another embodiment of the present disclosure.

In order to optimize the above embodiment, reference is made to FIG. 8, which is a flowchart of a power derating method for a photovoltaic tracking system according to another embodiment of the present disclosure. Based on the embodiment shown in FIG. 4, the method further includes the following step S107 after step S105.

In step S107, when the current operating power of the photovoltaic inverter is lower than the target derating power or power limitation of the photovoltaic tracking system is eliminated, the photovoltaic inverter is controlled to perform maximum power point tracking (MPPT), and the photovoltaic tracker is controlled to perform automatic tracking.

Corresponding to the above method embodiment, a controller of a photovoltaic tracking system is further provided according to the present disclosure.

Figure 9:
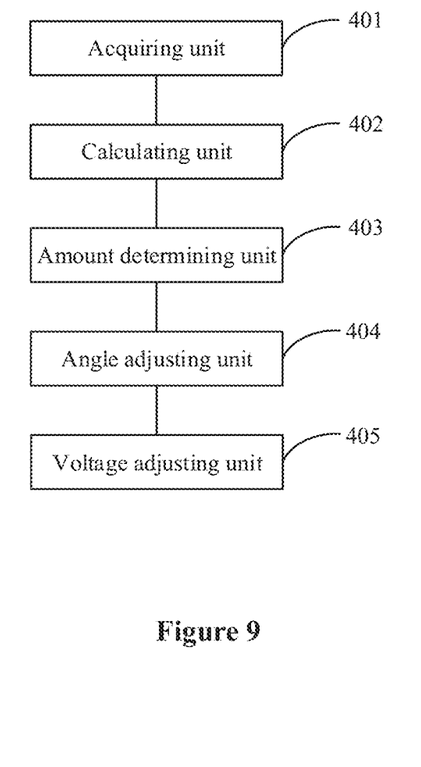
FIG. 9 is a schematic structural diagram of a controller of a photovoltaic tracking system according to an embodiment of the present disclosure.

Reference is made to FIG. 9, which is a schematic structural diagram of a controller of a photovoltaic tracking system according to an embodiment of the present disclosure. The controller in the photovoltaic tracking system is connected as shown in the embodiment shown in FIG. 3, which is not described in detail here. The controller includes an acquiring unit 401, a calculating unit 402, an amount determining unit 403, an angle adjusting unit 404, and a voltage adjusting unit 405.

The acquiring unit 401 is configured to acquire a current operating power and a target derating power of a photovoltaic inverter.

In this embodiment, a target derating power P1 may be represented in various forms, such as a set power and a percentage of power. In practice, the target derating power is directly set. For example, the photovoltaic inverter is required to operate at a power not greater than 50 kW, that is, P1=50 kW. Alternatively, a target derating power is determined to be equal to 50% of the power rating Pn, that is, P1=50%*Pn, or a target derating power is determined to be equal to 50% of a current power P0, that is, P1=50%*P0. The target derating power P1 can be obtained through simple calculation and conversion regardless of a form in which the target derating power P1 is represented.

The calculating unit 402 is configured to calculate a total power derating amount based on the current operating power and the target derating power.

A total power derating amount $\Delta P$ is calculated from the following equation (1):

$$\Delta P = P0 - P1 \qquad (1)$$

where P0 represents the current operating power of the photovoltaic inverter, and P1 represents the target derating power.

The amount determining unit 403 is configured to determine a target power derating amount by a photovoltaic tracker based on the total power derating amount and a preset derating amount distribution coefficient.

A target power derating amount $\Delta Pt$ by the photovoltaic tracker is calculated from the following equation (2):

$$\Delta Pt = k*(P0-P1) = k*\Delta P \qquad (2)$$

where k represents the preset derating amount distribution coefficient and has a value that is an element of (0, 1). An excessively small value of k results in failure in full use of the photovoltaic tracker in power derating. In a case of an excessively large value of k, or in a case that the power derating for the entire photovoltaic tracking system is completely performed by the photovoltaic tracker, the optical power is still changing after the tracking angle is fixed and therefore the photovoltaic inverter cannot increase the power, especially when the sunlight becomes weak. In this case, it is required to control the photovoltaic tracker to adjust a photovoltaic tracking bracket frequently, affecting a service life of the photovoltaic tracking bracket. It is found from research that the value of k preferably ranges from 0.5 to 0.7. With the value of k ranging from 0.5 to 0.7, it can be ensured that the power is mostly decreased by the photovoltaic tracker and then the power is further slightly decreased by the photovoltaic inverter.

It should be noted that in order to realize power derating according to the present disclosure, the total power derating amount $\Delta P$ is divided into two parts. First, in response to a request for power derating, the photovoltaic module is adjusted to be at an angle and is fixed at the angle, so that the power is mostly decreased by $\Delta Pt$. Then, the photovoltaic inverter slightly adjusts the voltage to further decrease the power by $\Delta Pi$ ($\Delta Pi=\Delta P-\Delta Pt$). That is, the photovoltaic tracker performs coarse adjustment and the photovoltaic inverter performs fine adjustment, thereby achieving the best adjustment effect.

The angle adjusting unit 404 is configured to determine a target tracking angle based on the target power derating amount, and control the photovoltaic tracker to adjust the photovoltaic module to be at the target tracking angle and fix the photovoltaic module.

The voltage adjusting unit 405 is configured to control the photovoltaic inverter to adjust a direct current operating voltage based on a difference between the total power derating amount and the target power derating amount.

After the photovoltaic tracker is controlled to adjust the photovoltaic module to be at the target tracking angle and fix the photovoltaic module, the photovoltaic inverter adjusts the direct current operating voltage based on the difference between the total power derating amount and the target power derating amount.

A power derating amount $\Delta Pi$ by the photovoltaic inverter is calculated from the following equation (3):

$$\Delta Pi=\Delta P-\Delta Pt \qquad (3)$$

where the power derating amount $\Delta Pi$ by the photovoltaic inverter is presented in another form of $\Delta Pi=(1-k)*(P0-P1)$ by substituting the equation (1) and the equation (2) into the equation (3).

In summary, a controller of a photovoltaic tracking system is provided according to the present disclosure. A current operating power and a target derating power of a photovoltaic inverter are acquired. A total power derating amount is calculated based on the current operating power and the target derating power. A target power derating amount by a photovoltaic tracker is determined based on the total power derating amount and a preset derating amount distribution coefficient. A target tracking angle is determined based on the target power derating amount. The photovoltaic tracker is controlled to adjust a photovoltaic module to be at the target tracking angle and fix the photovoltaic module. The photovoltaic inverter is controlled to adjust a direct current operating voltage based on a difference between the total power derating amount and the target power derating amount. In order to perform power derating by the photovoltaic inverter according to the present disclosure, it is unnecessary to increase the operating voltage of the entire photovoltaic system. Based on the current operating power and the target derating power of the photovoltaic inverter, the photovoltaic tracker is controlled to adjust the photovoltaic module to be at the target tracking angle and fix the photovoltaic module, so that the power derating is performed partly based on the target power derating amount to decrease a current and output power significantly, thereby avoiding an increase in component stress and a decrease in power quality. Further, the power derating is performed by the photovoltaic inverter based on the difference obtained by subtracting the target power derating amount from the total power derating amount, so that the power derating is performed completely. In this way, the reliability of the photovoltaic tracking system is increased while performing the power derating, without affecting the service life of the photovoltaic tracking system.

In the above embodiment, since it is required to input the target tracking angle $\theta$ to the photovoltaic tracking system, after calculating the power amount $\Delta Pt$ that the photovoltaic tracking system is to be decreased by, the controller needs to convert the power amount $\Delta Pt$ into the target tracking angle $\theta$.

The angle adjusting unit 404 is further configured to: calculate a target power of the photovoltaic tracking system based on the current operating power and the target power derating amount; determine a target tracking angle corresponding to the target power based on a correspondence between a power and a tracking angle, where the correspondence is pre-determined based on a change in optical power; and control the photovoltaic tracker to adjust the photovoltaic module to be at the target tracking angle and fix the photovoltaic module at the target tracking angle.

In this embodiment, the correspondence (which may be shown in a table) between the power and the tracking angle is pre-determined based on the change in optical power. After the target power of the photovoltaic tracking system is calculated based on the current operating power and the target power derating amount, the target tracking angle corresponding to the target power is acquired based on the correspondence, so that the photovoltaic tracker is controlled to adjust the photovoltaic module to be at the target tracking angle and fix the photovoltaic module at the target tracking angle. That is, open-loop adjustment is performed with a relatively coarse adjustment result. With the open-loop adjustment, the photovoltaic module is quickly adjusted to be at the target tracking angle, so as to decrease the power.

The angle adjusting unit 404 is further configured to: calculate a target power of the photovoltaic tracking system based on the current operating power and the target power derating amount; control the photovoltaic tracker to dynamically adjust a tracking angle of the photovoltaic module, and acquire the latest operating power of the photovoltaic tracking system in real time; determine, when the latest operating power is equal to the target power, a tracking angle corresponding to the latest operating power that is equal to the target power, as the target tracking angle; and control the photovoltaic tracker to fix the photovoltaic module at the target tracking angle.

In the closed-loop adjustment according to this embodiment, the controller controls the photovoltaic tracker to dynamically adjust the tracking angle of the photovoltaic module, and acquires the latest operating power of the photovoltaic tracking system in real time. When the power is decreased by $\Delta Pt$, that is, when the latest operating power is equal to the target power, the controller controls the photovoltaic tracker to fix the photovoltaic module at the target tracking angle.

The photovoltaic inverter slightly adjusts the power by changing an operating voltage of the photovoltaic module. In the vicinity of a maximum power point (MPP), the power can be decreased by adjusting a voltage point both left and right. Since an output current of the photovoltaic module is greatly decreased by the photovoltaic tracker, the thermal stress will not excessively large even if the photovoltaic inverter adjusts an operating point to the left. Therefore, the photovoltaic inverter can flexibly adjust the operating voltage in any direction.

In order to optimize the above embodiment, the voltage adjusting unit 405 is further configured to: control, based on the difference between the total power derating amount and the target power derating amount, the photovoltaic inverter to adjust the direct current operating voltage of the photovoltaic module to the left from the maximum power point or adjust the direct current operating voltage of the photovoltaic module to the right from the maximum power point.

In practice, the voltage adjusting unit 405 is further configured to: in case of a single photovoltaic inverter, control, based on the difference, the photovoltaic inverter to adjust the direct current operating voltage of each of all or some of photovoltaic modules in a photovoltaic string connected to the photovoltaic inverter; and in a case of multiple photovoltaic inverters, control, based on the difference, each of all or some of the multiple photovoltaic inverters to adjust a voltage of a photovoltaic string connected to the photovoltaic inverter to be a target voltage.

The optical power is changing during the power derating. After the photovoltaic tracker adjusts the photovoltaic module to be at the target tracking angle and the photovoltaic module is fixed at the target tracking angle, the photovoltaic inverter performs rapid adjustment for the power derating. Only when the adjustment performed by the photovoltaic inverter is beyond the adjustment capacity (for example, reaching a set stress margin), the total power derating amount ΔP is recalculated, and the photovoltaic tracking system is readjusted.

Therefore, the controller further includes a returning unit. The returning unit is configured to acquire, after the voltage adjusting unit 405 controls the photovoltaic inverter to adjust the direct current operating voltage based on the difference between the total power derating amount and the target power derating amount, and if it is determined that the adjustment is beyond a preset adjustment capability of the photovoltaic inverter and the difference is still greater than zero, the latest operating power of the photovoltaic inverter and perform power derating based on the latest operating power and the target derating power.

In order to optimize the above embodiment, the controller further includes a state returning unit. The state returning unit is configured to control, after the voltage adjusting unit 405 controls the photovoltaic inverter to adjust the direct current operating voltage based on the difference between the total power derating amount and the target power derating amount, and when the current operating power of the photovoltaic inverter is lower than the target derating power or power limitation of the photovoltaic tracking system is eliminated, the photovoltaic inverter to perform the maximum power point tracking (MPPT), and the photovoltaic tracker to perform automatic tracking.

Finally, it should be further noted that relationship terminologies such as first and second herein are only used to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a series of elements includes not only the elements but also other elements that are not enumerated, or also includes the elements inherent for the process, method, article or device. Unless expressively limited otherwise, the statement "comprising (including) one . . . " does not exclude the case that other similar elements may exist in the process, method, article or device.

The embodiments in this specification are described in a progressive way, each of which emphasizes the differences from others, and the same or similar parts among the embodiments can be referred to each other.

The disclosed embodiments are described above, so that those skilled in the art can implement or carry out the present disclosure. Those skilled in the art can easily think of various modifications to the disclosed embodiments, and the general principles defined herein may be implemented in other embodiments without departing from the spirit or scope of the present disclosure. Therefore, the present disclosure should not be limited to the described embodiments, but conforms to the widest scope that complies with the principles and novelty disclosed herein.

The invention claimed is:

1. A power derating method for a photovoltaic tracking system, wherein the method is applied to a controller of the photovoltaic tracking system, and the method comprises:
   acquiring a current operating power and a target derating power of a photovoltaic inverter;
   calculating a total power derating amount based on the current operating power and the target derating power;
   determining a target power derating amount by a photovoltaic tracker based on the total power derating amount and a preset derating amount distribution coefficient;
   determining a target tracking angle based on the target power derating amount, and controlling the photovoltaic tracker to adjust a photovoltaic module to be at the target tracking angle and fix the photovoltaic module; and
   controlling the photovoltaic inverter to adjust a direct current operating voltage based on a difference between the total power derating amount and the target power derating amount.

2. The power derating method according to claim 1, wherein the determining a target tracking angle based on the target power derating amount, and controlling the photovoltaic tracker to adjust a photovoltaic module to be at the target tracking angle and fix the photovoltaic module comprises:
   calculating a target power of the photovoltaic tracking system based on the current operating power and the target power derating amount;
   determining a target tracking angle corresponding to the target power based on a correspondence between a power and a tracking angle, wherein the correspondence is pre-determined based on a change in an optical power; and
   controlling the photovoltaic tracker to adjust the photovoltaic module to be at the target tracking angle and fix the photovoltaic module.

3. The power derating method according to claim 2, wherein the controlling the photovoltaic tracker to adjust the photovoltaic module to be at the target tracking angle and fix the photovoltaic module comprises:
   controlling the photovoltaic tracker to adjust the photovoltaic module forward to be at the target tracking angle and fix the photovoltaic module; or
   controlling the photovoltaic tracker to adjust the photovoltaic nodule backward to be at the target tracking angle and fix the photovoltaic module.

4. The power derating method according to claim 1, wherein the determining a target tracking angle based on the target power derating amount, and controlling the photovoltaic tracker to adjust a photovoltaic module to be at the target tracking angle and fix the photovoltaic module comprises:

calculating a target power of the photovoltaic tracking system based on the current operating power and the target power derating amount;

controlling the photovoltaic tracker to dynamically adjust a tracking angle of the photovoltaic module, and acquiring a latest operating power of the photovoltaic tracking system in real time;

determining, when the latest operating power is equal to the target power, a tracking angle corresponding to the latest operating power that is equal to the target power, as the target tracking angle; and controlling the photovoltaic tracker to fix the photovoltaic module at the target tracking angle.

5. The power derating method according to claim 1, wherein the controlling the photovoltaic inverter to adjust a direct current operating voltage based on a difference between the total power derating amount and the target power derating amount comprises:

controlling, based on the difference between the total power derating amount and the target power derating amount, the photovoltaic inverter to adjust the direct current operating voltage of the photovoltaic module to the left from a maximum power point or adjust the direct current operating voltage of the photovoltaic module to the right from the maximum power point.

6. The power derating method according to claim 1, wherein the controlling the photovoltaic inverter to adjust a direct current operating voltage based on a difference between the total power derating amount and the target power derating amount comprises:

controlling, in case of a single photovoltaic inverter and based on the difference, the photovoltaic inverter to adjust the direct current operating voltage of each of all or some of photovoltaic modules in a photovoltaic string connected to the photovoltaic inverter; and controlling, in a case of a plurality of photovoltaic inverters and based on the difference, each of all or some of the plurality of photovoltaic inverters to adjust a voltage of a photovoltaic string connected to the photovoltaic inverter to be a target voltage.

7. The power derating method according to claim 1, wherein after the controlling the photovoltaic inverter to adjust a direct current operating voltage based on a difference between the total power derating amount and the target power derating amount, the method further comprises:

if adjustment performed by the photovoltaic inverter is beyond a preset adjustment capability and the difference is still greater than zero, acquiring a latest operating power of the photovoltaic inverter, and performing power derating based on the latest operating power and the target derating power.

8. The power derating method according to claim 1, wherein after the controlling the photovoltaic inverter to adjust a direct current operating voltage based on a difference between the total power derating amount and the target power derating amount, the method further comprises:

if the current operating power of the photovoltaic inverter is lower than the target derating power or power limitation of the photovoltaic tracking system is eliminated, controlling the photovoltaic inverter to perform maximum power point tracking (MPPT), and controlling the photovoltaic tracker to perform automatic tracking.

9. A controller of a photovoltaic tracking system, comprising:

an acquiring unit configured to acquire a current operating power and a target derating power of a photovoltaic inverter;

a calculating unit configured to calculate a total power derating amount based on the current operating power and the target derating power;

an amount determining unit configured to determine a target power derating amount by a photovoltaic tracker based on the total power derating amount and a preset derating amount distribution coefficient;

an angle adjusting unit configured to determine a target tracking angle based on the target power derating amount, and control the photovoltaic tracker to adjust a photovoltaic module to be at the target tracking angle and fix the photovoltaic module; and a voltage adjusting unit configured to control the photovoltaic inverter to adjust a direct current operating voltage based on a difference between the total power derating amount and the target power derating amount.

10. The controller according to claim 9, wherein the angle adjusting unit is further configured to:

calculate a target power of the photovoltaic tracking system based on the current operating power and the target power derating amount;

determine a target tracking angle corresponding to the target power based on a correspondence between a power and a tracking angle, wherein the correspondence is pre-determined based on a change in an optical power; and control the photovoltaic tracker to adjust the photovoltaic module to be at the target tracking angle and fix the photovoltaic module.

11. The controller according to claim 9, wherein the angle adjusting unit is further configured to:

calculate a target power of the photovoltaic tracking system based on the current operating power and the target power derating amount;

control the photovoltaic tracker to dynamically adjust a tracking angle of the photovoltaic module, and acquire a latest operating power of the photovoltaic tracking system in real time;

determine, when the latest operating power is equal to the target power, a tracking angle corresponding to the latest operating power that is equal to the target power, as the target tracking angle; and control the photovoltaic tracker to fix the photovoltaic module at the target tracking angle.

12. The controller according to claim 9, further comprising:

a returning unit configured to acquire, after the voltage adjusting unit controls the photovoltaic inverter to adjust the direct current operating voltage based on the difference between the total power derating amount and the target power derating amount, and if adjustment performed by the photovoltaic inverter is beyond a preset adjustment capability and the difference is still greater than zero, a latest operating power of the photovoltaic inverter and perform power derating based on the latest operating power and the target derating power.

13. The controller according to claim 9, further comprising:

a state returning unit configured to control, after the voltage adjusting unit controls the photovoltaic inverter to adjust the direct current operating voltage based on the difference between the total power derating amount and the target power derating amount, and if the current operating power of the photovoltaic inverter is lower than the target derating power or power limitation of the photovoltaic tracking system is eliminated, the photovoltaic inverter to perform maximum power point tracking (MPPT), and the photovoltaic tracker to perform automatic tracking.

14. A photovoltaic tracking system, comprising:
a photovoltaic module;
a photovoltaic tracker;
a photovoltaic inverter; and
a controller, wherein
the controller is communicably connected to the photovoltaic tracker and the photovoltaic inverter;
the photovoltaic tracker is mechanically connected to at least one of the photovoltaic module; and
the photovoltaic inverter comprises a direct current end connected to at least one of the photovoltaic module,
wherein the controller comprises:
an acquiring unit configured to acquire a current operating power and a target derating power of the photovoltaic inverter;
a calculating unit configured to calculate a total power derating amount based on the current operating power and the target derating power;
an amount determining unit configured to determine a target power derating amount by the photovoltaic tracker based on the total power derating amount and a preset derating amount distribution coefficient;
an angle adjusting unit configured to determine a target tracking angle based on the target power derating amount, and control the photovoltaic tracker to adjust the photovoltaic module to be at the target tracking angle and fix the photovoltaic module; and
a voltage adjusting unit configured to control the photovoltaic inverter to adjust a direct current operating voltage based on a difference between the total power derating amount and the target power derating amount.

15. The photovoltaic tracking system according to claim 14, wherein the angle adjusting unit is further configured to:
calculate a target power of the photovoltaic tracking system based on the current operating power and the target power derating amount;
determine a target tracking angle corresponding to the target power based on a correspondence between a power and a tracking angle, wherein the correspondence is pre-determined based on a change in an optical power; and
control the photovoltaic tracker to adjust the photovoltaic module to be at the target tracking angle and fix the photovoltaic module.

16. The photovoltaic tracking system according to claim 14, wherein the angle adjusting unit is further configured to:
calculate a target power of the photovoltaic tracking system based on the current operating power and the target power derating amount;
control the photovoltaic tracker to dynamically adjust a tracking angle of the photovoltaic module, and acquire a latest operating power of the photovoltaic tracking system in real time;
determine, when the latest operating power is equal to the target power, a tracking angle corresponding to the latest operating power that is equal to the target power, as the target tracking angle; and
control the photovoltaic tracker to fix the photovoltaic module at the target tracking angle.

17. The photovoltaic tracking system according to claim 14, wherein the controller further comprises:
a returning unit configured to acquire, after the voltage adjusting unit controls the photovoltaic inverter to adjust the direct current operating voltage based on the difference between the total power derating amount and the target power derating amount, and if adjustment performed by the photovoltaic inverter is beyond a preset adjustment capability and the difference is still greater than zero, a latest operating power of the photovoltaic inverter and perform power derating based on the latest operating power and the target derating power.

18. The photovoltaic tracking system according to claim 14, wherein the controller further comprises:
a state returning unit configured to control, after the voltage adjusting unit controls the photovoltaic inverter to adjust the direct current operating voltage based on the difference between the total power derating amount and the target power derating amount, and if the current operating power of the photovoltaic inverter is lower than the target derating power or power limitation of the photovoltaic tracking system is eliminated, the photovoltaic inverter to perform maximum power point tracking (MPPT), and the photovoltaic tracker to perform automatic tracking.

* * * * *